United States Patent
Wingert et al.

(10) Patent No.: US 6,666,404 B1
(45) Date of Patent: Dec. 23, 2003

(54) TRIPODAL MODULAR UNMANNED ROTORCRAFT

(75) Inventors: David A. Wingert, Fountain Hills, AZ (US); James Hanna, Maple Valley, WA (US); Donald E. Jones, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/267,722

(22) Filed: Oct. 8, 2002

(51) Int. Cl.[7] .............................................. B64C 27/00
(52) U.S. Cl. .................................. 244/17.19; 244/23 C
(58) Field of Search .......................... 244/17.19, 17.11, 244/17.25, 23 C, 3.22

(56) References Cited

U.S. PATENT DOCUMENTS

| | | | | |
|---|---|---|---|---|
| 1,692,397 A | * | 11/1928 | Wagner ................. | 244/17.19 |
| 2,058,678 A | * | 10/1936 | Fry ....................... | 244/17.17 |
| 2,382,460 A | * | 8/1945 | Young .................... | 244/7 B |
| 3,559,922 A | * | 2/1971 | Gluhareff ............... | 244/17.17 |
| 6,352,220 B1 | * | 3/2002 | Banks et al. ........... | 244/17.19 |
| 6,450,445 B1 | * | 9/2002 | Moller ................... | 244/23 A |

* cited by examiner

*Primary Examiner*—J. Woodrow Eldred
(74) *Attorney, Agent, or Firm*—DiPinto & Shimokaji, P.C.

(57) ABSTRACT

Conventional rotorcraft are required to provide a significant amount of anti-torque movement to offset the torque created by the rotor and the right-angle gearbox coupling the rotor to the engine. By vertically integrating the engine in the unmanned rotorcraft of the present invention, the torque component rising from the right-angle gearbox is eliminated. This type of adaptation, however, is generally unacceptable in conventional helicopter integration, since a vertically mounted engine directly under the rotor would deprive the user of critical payload volume at the center of gravity. The radial distribution of payload in the design of the present invention avoids this penalty. Conventional anti-torque systems, including tail rotors, ducted gas, and dual counter rotating rotors produce drag, weight, and efficiency penalties. The rotorcraft of the present invention uses a hybrid system combining a counter rotating internal rotor/fan and jet nozzles at the ends of the three arms to provide efficient anti-torque controls. In addition to the anti-torque element, the jet nozzles at the ends of the three arms provide attitude control and directional maneuvering.

29 Claims, 5 Drawing Sheets

TRIPODAL MODULAR UNMANNED ROTORCRAFT

BACKGROUND OF THE INVENTION

The present invention generally relates to a rotorcraft apparatus and, more specifically, to an unmanned rotorcraft apparatus employing a unique combination of anti-torque, modular construction, aeromechanics, and system/subsystem integration.

Anti-torque has been traditionally provided by tail rotors, fan-tails, and, more recently, by the NOTAR® thrust vectoring system. Tail rotors and fan-tails are operated using power from the main engine, thus resulting in a loss in efficiency of the main engine's overall output to the main rotor. Moreover, these conventional systems present vulnerability problems with the exposed rotating machinery. Not only do these supplemental rotors add to the size of the rotorcraft, but they also pose additional mechanical and safety issues.

Alternatives to these anti-torque systems include a dual counter-rotating main rotors, such as installed on the Russian Ka-25, or a tandem installation of rotors, as installed on the Boeing CH-47 Chinook. These approaches, however, result in large, mechanically complex aircraft which, while suitable for heavy lift operations, are poor choices for smaller, low cost unmanned systems.

It is often necessary to install apertures in aircraft to provide for navigation, communications, and target identification and designation. This is often accomplished using optical equipment, such as a camera or laser ranger. Conventional helicopter fuselages offer no solution for the lack of surface area for aperture installation facing the desired directions. Rotorcraft are frequently required to add surfaces, protuberances, or other drag producing features to accommodate apertures. In the case of electro-optical sensors with forward field-of-view capability, huge turret structures, such as those installed on the AH-64 Apache and the RAH-66 Comanche are common.

Conventional rotorcraft achieve mission flexibility by incorporating large internal volumes with optional externally mounted pods and weapons. These approaches simultaneously add drag, increase vulnerability, and force the aircraft to be larger than needed for individual missions as the internal spaces must be sized for all desired combinations.

As can be seen, there is a need for an improved unmanned rotorcraft apparatus that has the combination of a simple anti-torque design, a modular construction to allow for mission flexibility, and excellent aeromechanics. The absence of a crew enables significant departure from conventional overall vehicle integration approaches.

SUMMARY OF THE INVENTION

In one aspect of the present invention, a rotorcraft comprises a central core structure having an engine; a main rotor driven by the engine; a plurality of arms attached to the central core structure, each of the plurality of arms having a storage region therein; and tip jets at a distal end of each of the plurality of arms wherein an air stream passing through select tip jets provide anti-torque and attitude control for the rotorcraft.

In another aspect of the present invention, a tripodal unmanned rotorcraft comprises a central core structure having an engine; a main rotor driven by the engine; first, second, and third arms attached to the central core structure, each of the first, second and third arms having a storage region therein; tip jets at a distal end of each of the first, second and third arms wherein an air stream passing through select tip jets provide anti-torque and attitude control for the rotorcraft; tip jet plumbing for supplying the air stream to the tip jets from an engine bleed; and a compressor bleed plenum for collecting and evenly distributing the engine bleed to the tip jet plumbing.

In yet another aspect of the present invention, a tripodal unmanned rotorcraft for delivering a payload to a remote location, comprises a central core structure having an engine; a main rotor driven by the engine; first, second, and third arms attached to the central core structure, each of the first, second and third arms being equally spaced about the central core structure and having a storage region therein for containing the payload; tip jets at a distal end of each of the first, second and third arms wherein an air stream passing through select tip jets provide anti-torque, attitude control, and directional maneuvering for the rotorcraft; and tip jet plumbing for supplying the air stream to the tip jets from an engine bleed; a compressor bleed plenum for collecting and evenly distributing the engine bleed to the tip jet plumbing; and an internal fan/rotor in the central core structure rotating in a direction opposite that of the rotor to provide an anti-torque element as well as an additional cooling air flow to the central core structure.

In a further aspect of the present invention, a tripodal modular unmanned rotorcraft comprises a central core structure having an engine; a main rotor driven by the engine; first, second, and third arms detachably connected to the central core structure, each of the first, second and third arms being equally spaced about the central core structure and having a storage region therein; landing gear located at a distal end of each of the first, second and third arms; tip jets at a distal end of each of the first, second and third arms wherein an air stream passing through select tip jets provide anti-torque, attitude control, and directional maneuvering for the rotorcraft; tip jet plumbing for supplying the air stream to the tip jets from an engine bleed; a compressor bleed plenum for collecting and evenly distributing the engine bleed to the tip jet plumbing; and an internal rotor/fan in the central core structure, rotating opposite that of the rotor, to provide an anti-torque element as well as an additional cooling air flow to the central core structure.

In still a further aspect of the present invention, a method for making a rotorcraft, comprises vertically mounting an engine in a central core structure of the rotorcraft, the engine driving a main rotor; detachably connecting a first arm, a second arm and a third arm to the central core structure, each of the first arm, the second arm and the third arm having a storage region therein; providing means for generating pressurized air in the central core; delivering the pressurized air to tip jets located at a distal end of each of the first arm, the second arm, and the third arm, whereby when the pressurized air passes through the tip jets, anti-torque, attitude control, and directional maneuvering is provided for the rotorcraft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an unmanned rotorcraft useful for supplying communication equipment, supplies, weapons, sensors, fuel and the like to areas where delivery by conventional means may be dangerous or otherwise imprudent or impossible.

Conventional rotorcraft are required to provide a significant amount of anti-torque movement to offset the torque created by the rotor and the right-angle gearbox coupling the rotor to the engine. By vertically integrating the engine in the unmanned rotorcraft of the present invention, the torque component rising from the right-angle gearbox is eliminated. This type of adaptation, however, is generally unacceptable in conventional helicopter integration, since a vertically mounted engine directly under the rotor would deprive the user of critical payload volume at the center of gravity. The radial distribution of payload in the design of the present invention avoids this penalty.

Conventional anti-torque systems, including tail rotors, NOTAR® ducted gas, and dual counter rotating rotors produce drag, weight, and efficiency penalties. The rotorcraft of the present invention uses a hybrid system combining a counter rotating internal rotor/fan and jet nozzles at the ends of the three arms to provide efficient anti-torque controls.

Conventional helicopters have plentiful surface area for apertures in some directions, but, due to their design, apertures cannot be installed readily in every direction. The rotorcraft design according to the present invention provides equally distributed areas in all directions, enabling a superior low cost integration of all-aspect apertures.

Figure 1:
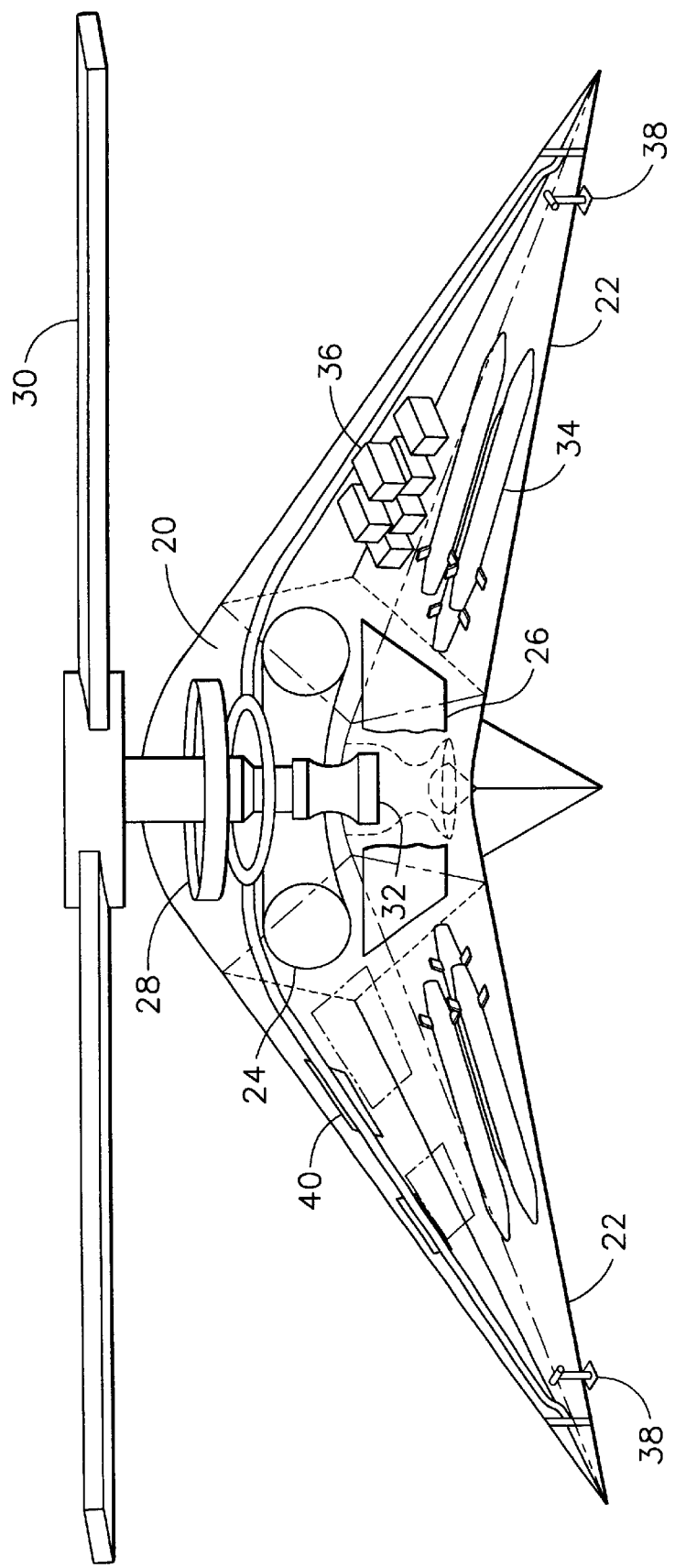
FIG. 1 is a partially cut-away side view of a tripodal unmanned rotorcraft according to an embodiment of the present invention.
Figure 2:
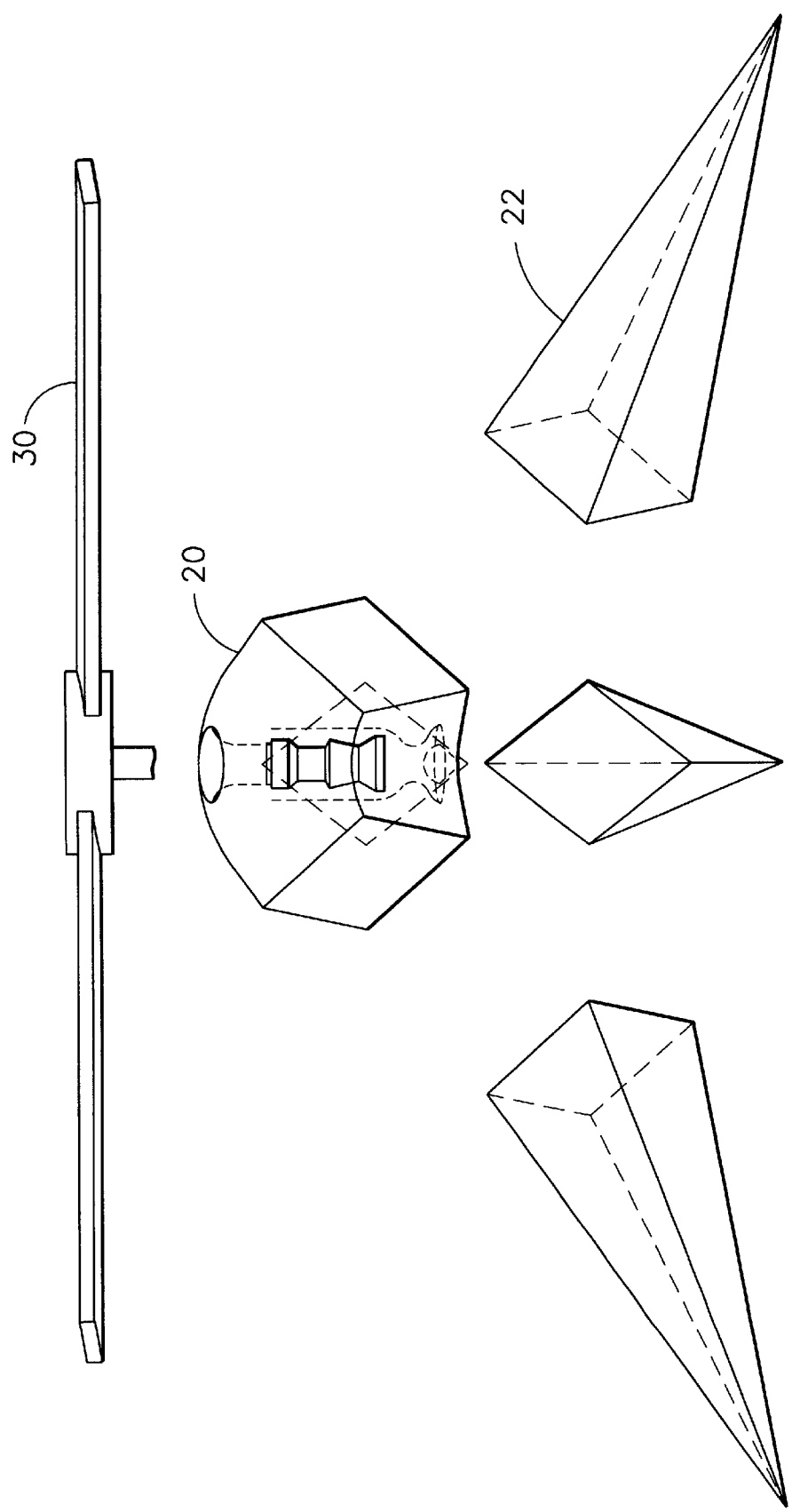
FIG. 2 is a schematic drawing showing the modular construction of the tripodal unmanned rotorcraft according to an embodiment of the present invention.

Referring to FIG. 1, there is shown a partially cut-away side view of a tripodal modular unmanned rotorcraft according to the present invention. Referring also to FIG. 2, for which there is shown a schematic drawing of the modular construction of the tripodal unmanned rotorcraft according to the present invention, the rotorcraft may include a central core structure 20 having a plurality of arms 22 attached thereto. For the embodiment shown, there may be three arms 22, of equal dimension, attached to central core structure 20.

An engine 32, rotor 30, internal rotor/fan 28, fuel tank 24, and non-modular systems 26 may be incorporated into central core structure 20. Engine 32 may be disposed directly below rotor 30, avoiding the necessity of a right-angle gear box.

Arms 22 may be attached using common mechanical systems, such as those employed in Navy aircraft wing fold mechanisms or those found in rotorcraft with folding empennage assemblies. The rotorcraft of the present invention may be constructed using conventional composite material approaches. Metals and metal alloys may also be employed to design the rotorcraft of the present invention. The design has a distinct cost advantage due to the fact that all arms 22 may be identical and may be shaped in a naturally simple arrangement without requiring any special or particular design requirement. Damage tolerance is enhanced by the fact that a damaged arm may be replaced quickly and easily, avoiding mission down time. Furthermore, with the cargo removed, the arms are substantially hollow, permitting full access to the internal and external surfaces of a damaged arm and allowing it to readily be repaired.

Each of the arms 22 may be configured in a wide range of cargo configurations to incorporate modular systems 36, weapons 34, sensors, mission specific avionics, mission and non-mission specific antennas, food, water, and other payloads. The lower surface tips of arms 22 may be equipped with skids or small wheels as landing gear 38.

The rotorcraft may be assembled with dissimilar arms 22. For example, a rotorcraft of the present invention may be assembled with one arm 22 containing missiles, another arm 22 containing a cannon, and the third arm 22 containing mission specific sensors.

If the loading of the arms results in a shift of the rotorcraft's center of gravity, provisions for shifting the center of gravity may be made by using fuel management and selective sequential firing of weapons. The unique modularity of the rotorcraft design allows any arm 22 containing a specific cargo to replace any other arm 22 which may be attached to the central core structure 20. Arms 22 may be mixed and matched at will, as long as the range of weight and balance conditions have been accommodated.

With one of more arms 22 removed from central core structure 20, access to internal systems, including engine 32, may be easily accomplished. With arms 22 and rotor 30 removed, the disassembled rotorcraft may be highly transportable.

The arm design of the rotorcraft of the present invention may provide excellent surface area for apertures 40. The rotorcraft design may provide equally distributed area in all directions, enabling a superior low cost integration of all-aspect apertures 40.

Figure 3:
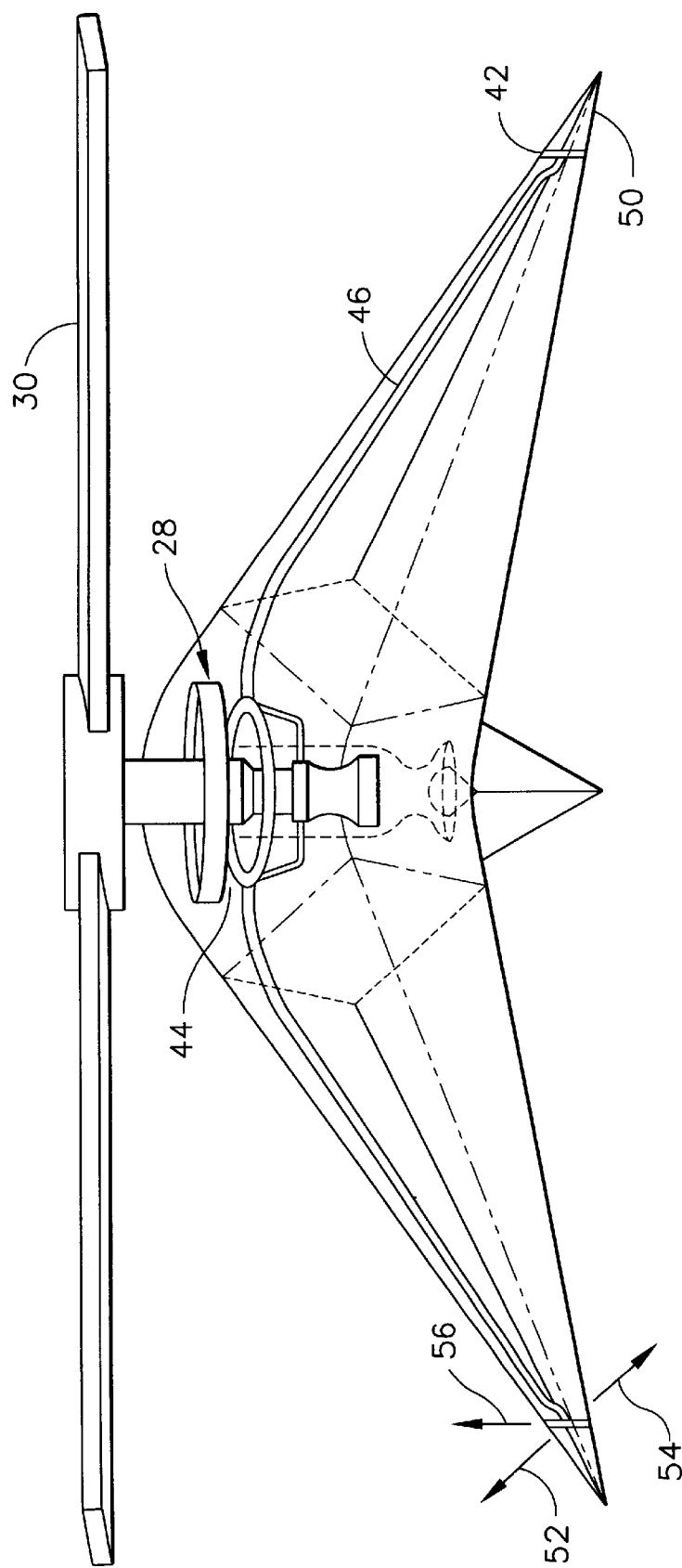
FIG. 3 is a partially cut-away side view showing the anti-torque and tip jet flight controls of the tripodal unmanned rotorcraft according to an embodiment of the present invention.

Referring now to FIG. 3, there is shown a partially cut-away side view of the anti-torque and tip jet flight controls of the tripodal unmanned rotorcraft according to an embodiment of the present invention.

A counter rotating internal rotor/fan 28 may be utilized to produce a component of torque opposite to that produced by rotor 30. The sizing of rotor/fan 28 may be significantly reduced over conventional anti-torque approaches due to the reduced requirement from elimination of the right-angle gearbox. Furthermore, internal rotor/fan 28 may have fan blades (not shown), providing additional cold flow for avionics cooling and thermal management. Fan blades may be similar to the low pressure front fan of high bypass turbofan engines to generate additional thrust exhausted at the bottom coannular to the core flow nozzle.

Tip jets 42 may be provided at the tips 50 of each arm 22 to provide both an anti-torque element as well as the primary flight controls for the rotorcraft attitude control and directional maneuvering. The engine compressor may be bled to provide high energy mass flow for tip jets 42 of each arm 22. A compressor plenum 44 may gather and evenly distribute engine compressor bleed gas to tip jets 42. Tip jet plumbing 46 may connect compressor plenum 44 to tip jets 42. Alternatively, high energy mass flow of air for tip jets 42 may be obtained by any conventional means, such as, for example, a compressor driven by the main engine. Tip jet plumbing 46 may be separated at the central core structure 20/arm 22 connection point with a conventional quick release coupling device. Tip jets 42 may provide thrust in three separate directions, depending on the rotorcraft flight and anti-torque needs. These three directions may be in a first direction 52 substantially along the direction of rotor rotation, in a second direction 54 opposite the first direction (a direction substantially opposite the direction of rotor rotation), and a third direction 56 substantially orthogonal to the first and second directions, thrusting arm 22 away from the plane of rotor rotation.

Figure 4:
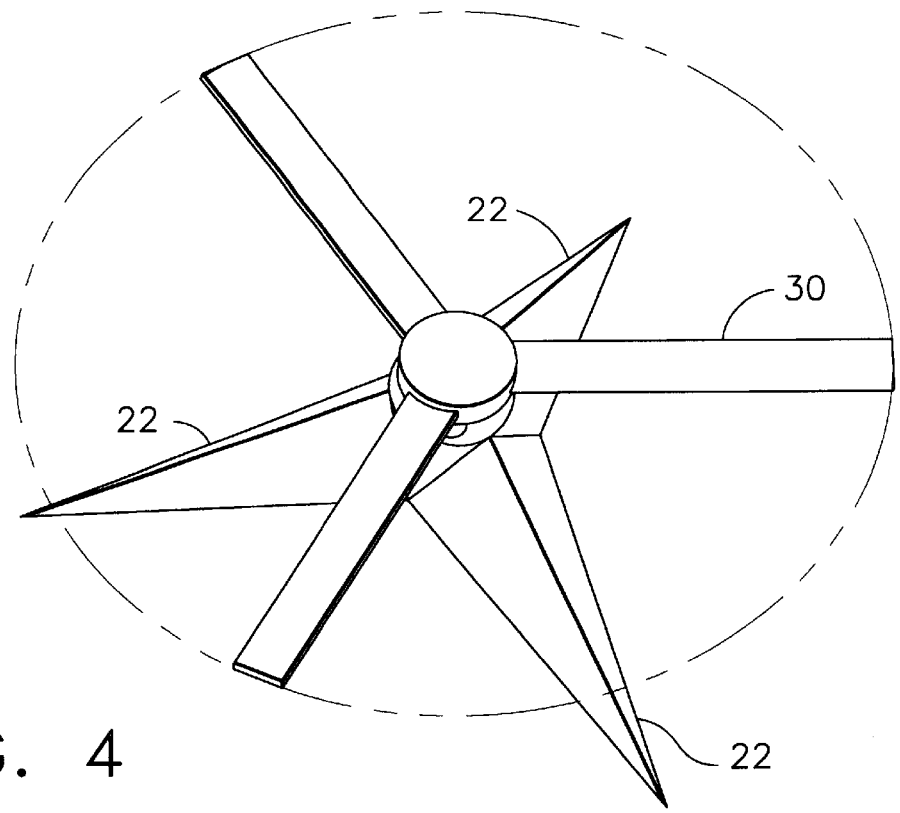
FIG. 4 is a perspective drawing showing the tripodal unmanned rotorcraft of FIG. 1 in a hover flight mode.

Referring to FIG. 4, there is shown a perspective drawing of the tripodal unmanned rotorcraft in a hover flight mode (vertical operation mode). The rotorcraft design of the present invention, in the vertical operation mode, may offer low aerodynamic download as compared with conventional rotorcraft with large wide fuselages blocking the air mass flow downstream of the rotor. Additionally, the design of the present invention may offer reduced propulsion efficiency losses resulting from the reduction of anti-torque requirements.

Figure 5:
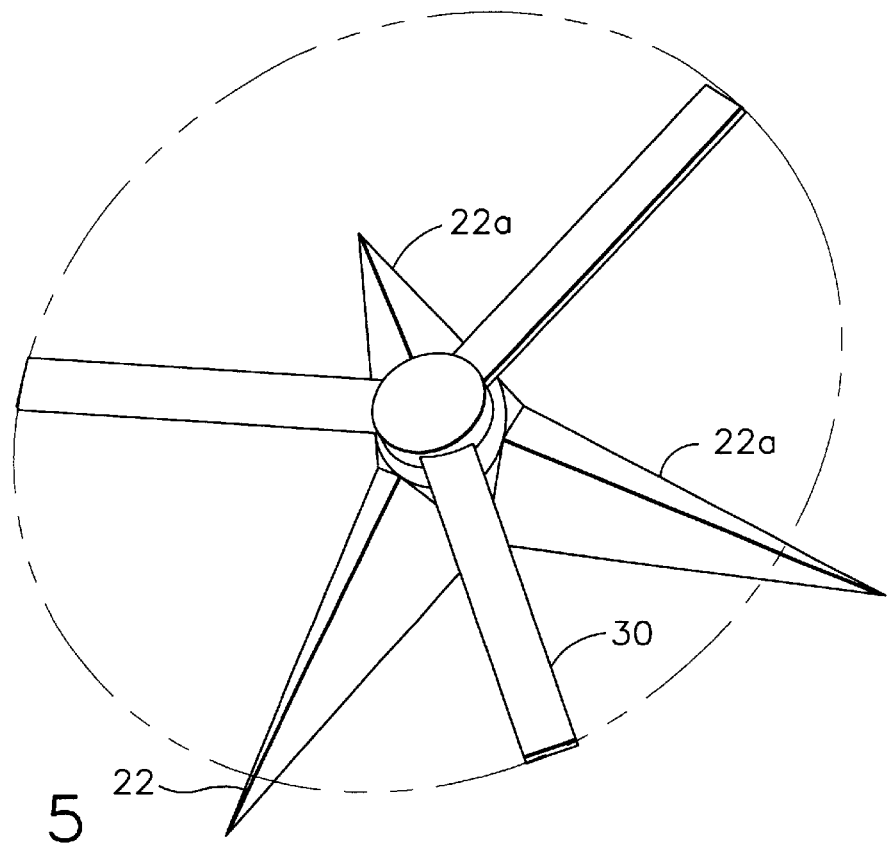
FIG. 5 is a perspective drawing showing the tripodal unmanned rotorcraft of FIG. 1 in a forward flight mode.

Referring to FIG. 5, there is shown a perspective drawing of the tripodal unmanned rotorcraft in a forward flight mode (horizontal flight mode). The rotorcraft design of the present invention, in the horizontal flight mode, offers high speed and low drag by tilting to a high forward pitch wherein the trailing two arms 22a behave aerodynamically as wings. The shape of the arms may be designed to provide a lift force during horizontal flight mode. This feature of the present invention may take advantage of the absence of a crew who would find the high pitch attitude of the horizontal flight mode uncomfortable or perhaps dangerous. By incorporating three arms 22 equally spaced about central core structure 20, the change from the vertical to the horizontal flight mode may be made rapidly by lowering the arm pointing closest to the direction of desired horizontal flight. This provides rapid directional maneuvering without requiring the rotorcraft to spin or turn.

Figure 6:
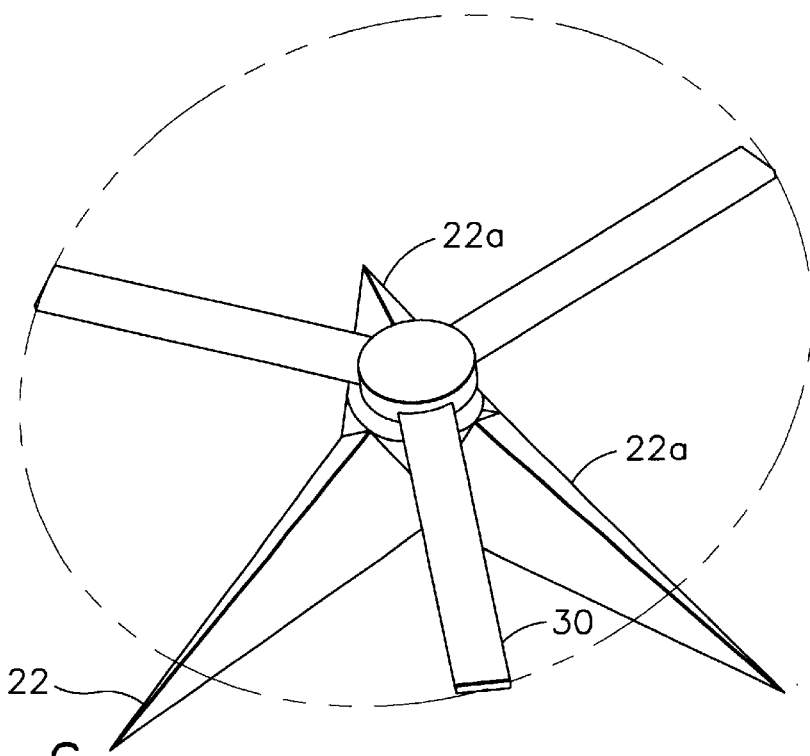
FIG. 6 is a perspective drawing showing an alternative embodiment the tripodal unmanned rotorcraft of FIG. 1 in a forward flight mode.
Figure 7:
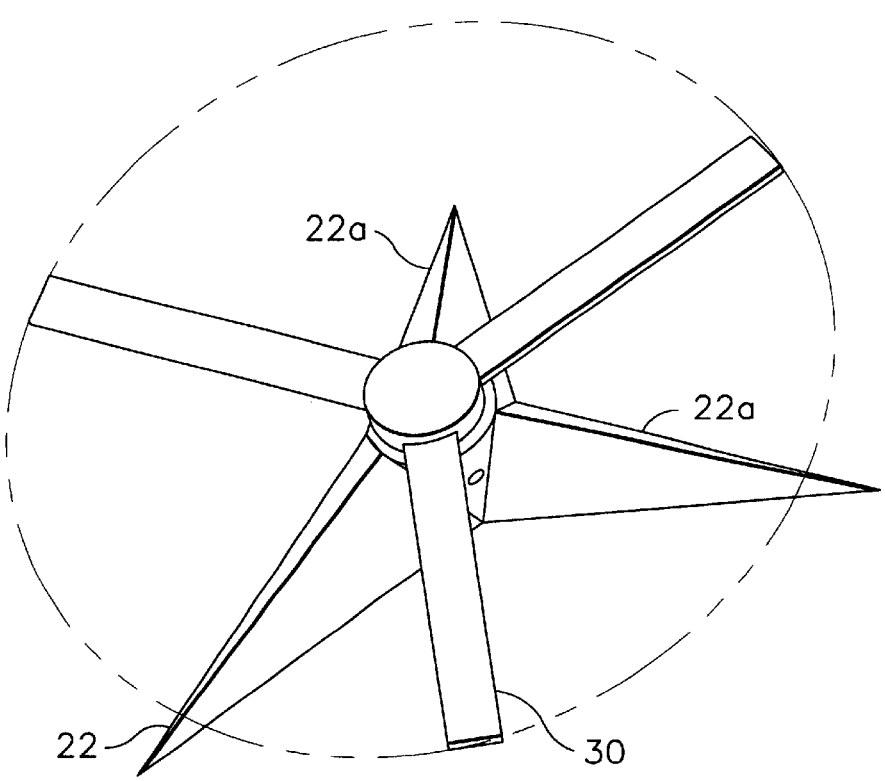
FIG. 7 is a perspective drawing showing another alternative embodiment the tripodal unmanned rotorcraft of FIG. 1 in a forward flight mode.

Referring to FIGS. 6 and 7, while the present invention has been described with three arms equally spaced along the central core structure, the invention is not intended to be limited as such. For example, two of the arms may be spaced at an angle of greater than 120°, providing a more conventional wing-like structure during horizontal flight mode (see FIG. 6). As described above, the wings may be attached using a conventional Navy aircraft wing fold mechanism, allowing the arms to be swept back during horizontal flight mode, thus producing less drag and achieving higher horizontal flight velocities (see FIG. 7).

While the present invention has been described using three arms of equal size, the present invention is not intended to be limited as such. Arms of different sizes may be attached, depending on the payload size requirements, so long as the weight between the three arms may be sufficiently balanced by payload balancing, fuel management, and the like.

It should be understood, of course, that the foregoing relates to preferred embodiments of the invention and that modifications may be made without departing from the spirit and scope of the invention as set forth in the following claims.

We claim:

1. A rotorcraft comprising:
   a central core structure having a vertically mounted engine;
   a main rotor driven by said engine;
   a plurality of arms attached to said central core structure, each of said plurality of arms having a storage region therein; and
   tip jets at a distal end of each of said plurality of arms wherein an air stream passing through select tip jets provide anti-torque and attitude control for said rotorcraft.

2. The rotorcraft according to claim 2, further comprising tip jet plumbing for supplying said air stream to each of said tip jets from an engine bleed.

3. The rotorcraft according to claim 2, further comprising:
   a compressor bleed plenum for collecting and evenly distributing said engine bleed to said tip jet plumbing.

4. The rotorcraft according to claim 2, wherein:
   each of said tip jets produce a stream of air in at least one of a first direction, a second direction, and a third direction;
   said first direction being substantially parallel to a plane of said rotor in a direction of rotor rotation;
   said second direction being substantially parallel to a plane of said rotor in a direction opposite that of rotor rotation; and
   said third direction being substantially perpendicular to a plane of said rotor in a direction toward said rotor.

5. The rotorcraft according to claim 1, wherein said plurality of arms are three arms equally spaced about said central core structure.

6. The rotorcraft according to claim 1, wherein each of said plurality of arms are detachable from said central core structure.

7. The rotorcraft according to claim 1, further comprising:
   an internal rotor/fan in said central core structure;
   said internal rotor/fan rotation in a direction opposite that of said rotor to provide an anti-torque element as well as an additional cooling air flow to said central core structure.

8. The rotorcraft according to claim 1, further comprising:
   landing gear located at a distal end of each of said plurality of arms.

9. The rotorcraft according to claim 1, wherein said arms have a shape providing a lift portion during horizontal flight of said rotorcraft.

10. The rotorcraft according to claim 1, further comprising apertures on each of said arms to provide an equally distributed area in all directions for said apertures.

11. The rotorcraft according to claim 1, wherein said storage area carries a payload including at least one of weapons, sensors, fuel, communication equipment, and supplies.

12. A tripodal unmanned rotorcraft comprising:
   a central core structure having a vertically mounted engine;
   a main rotor driven by said engine;
   first, second, and third arms attached to said central core structure, each of said first, second and third arms having a storage region therein;

tip jets at a distal end of each of said first, second and third arms wherein an air stream passing through select tip jets provide anti-torque and attitude control for said rotorcraft;

tip jet plumbing for supplying said air stream to said tip jets from an engine bleed; and a compressor bleed plenum for collecting and evenly distributing said engine bleed to said tip jet plumbing.

13. The tripodal unmanned rotorcraft according to claim 12, wherein:

each of said tip jets produce a stream of air in at least one of a first direction, a second direction, and a third direction;

said first direction being substantially parallel to a plane of said rotor in a direction of rotor rotation;

said second direction being substantially parallel to a plane of said rotor in a direction opposite that of rotor rotation; and said third direction being substantially perpendicular to a plane of said rotor in a direction toward said rotor.

14. The tripodal unmanned rotorcraft according to claim 12, wherein each of said first, second and third arms are spaced equally about said central core structure.

15. The tripodal unmanned rotorcraft according to claim 12, wherein each of said first, second and third arms are detachable from said central core structure.

16. The tripodal unmanned rotorcraft according to claim 12, further comprising:

an internal rotor/fan in said central core structure;

said internal rotor/fan rotation in a direction opposite that of said rotor to provide an anti-torque element as well as an additional cooling air flow to said central core structure.

17. The rotorcraft according to claim 12, further comprising:

landing gear located at a distal end of each of said first, second and third arms.

18. The rotorcraft according to claim 12, wherein at least two of said first, second and third arms have a shape providing a lift portion during horizontal flight of said rotorcraft.

19. The rotorcraft according to claim 12, further comprising apertures on each of said first, second and third arms to provide an equally distributed area in all directions for said apertures.

20. The rotorcraft according to claim 12, wherein said storage area carries a payload including at least one of weapons, sensors, fuel, communication equipment, and supplies.

21. A tripodal unmanned rotorcraft for delivering a payload to a remote location, comprising:

a central core structure having a vertically mounted engine;

a main rotor driven by said engine;

first, second, and third arms attached to said central core structure, each of said first, second and third arms being equally spaced about said central core structure and having a storage region therein for containing said payload;

tip jets at a distal end of each of said first, second and third arms wherein an air stream passing through select tip jets provide anti-torque, attitude control, and directional maneuvering for said rotorcraft; and tip jet plumbing for supplying said air stream to said tip jets from an engine bleed;

a compressor bleed plenum for collecting and evenly distributing said engine bleed to said tip jet plumbing; and an internal fan/rotor in said central core structure rotating in a direction opposite that of said rotor to provide an anti-torque element as well as an additional cooling air flow to said central core structure.

22. The tripodal unmanned rotorcraft according to claim 21, wherein:

each of said tip jets produce a stream of air in at least one of a first direction, a second direction, and a third direction;

said first direction being substantially parallel to a plane of said rotor in a direction of rotor rotation;

said second direction being substantially parallel to a plane of said rotor in a direction opposite that of rotor rotation; and said third direction being substantially perpendicular to a plane of said rotor in a direction toward said rotor.

23. The tripodal unmanned rotorcraft according to claim 21, wherein each of said first, second and third arms are detachable from said central core structure.

24. The rotorcraft according to claim 21, further comprising:

landing gear located at a distal end of each of said plurality of arms.

25. The rotorcraft according to claim 21, wherein at least two of said first, second and third arms have a shape providing a lift portion during horizontal flight of said rotorcraft.

26. A tripodal modular unmanned rotorcraft comprising:

a central core structure having a vertically mounted engine;

a main rotor driven by said engine;

first, second, and third arms detachably connected to said central core structure, each of said first, second and third arms being equally spaced about said central core structure and having a storage region therein;

landing gear located at a distal end of each of said first, second and third arms;

tip jets at a distal end of each of said first, second and third arms wherein an air stream passing through select tip jets provide anti-torque, attitude control, and directional maneuvering for said rotorcraft;

tip jet plumbing for supplying said air stream to said tip jets from an engine bleed;

a compressor bleed plenum for collecting and evenly distributing said engine bleed to said tip jet plumbing; and an internal rotor/fan in said central core structure, rotating opposite that of said rotor, to provide an anti-torque element as well as an additional cooling air flow to said central core structure.

27. A method for making a rotorcraft, comprising:

vertically mounting an engine in a central core structure of said rotorcraft, said engine driving a main rotor;

detachably connecting a first arm, a second arm and a third arm to said central core structure, each of said first arm, said second arm and said third arm having a storage region therein;

providing means for generating pressurized air in said central core;

delivering said pressurized air to tip jets located at a distal end of each of said first arm, said second arm, and said third arm, whereby when said pressurized air passes through said tip jets, anti-torque, attitude control, and directional maneuvering is provided for said rotorcraft.

28. The method for making a rotorcraft according to claim 27, wherein said means for generating pressurized air includes a compressor bleed and a compressor bleed plenum for collecting and evenly distributing said compressor bleed to said tip jets.

29. The method for making a rotorcraft according to claim 27, further comprising providing an internal rotor/fan in said central core structure, rotating opposite that of said main rotor, to provide an anti-torque element as well as an additional cooling air flow to said central core structure.

* * * * *